Sept. 19, 1950        J. H. GEULA        2,522,818

OPTICAL LENS CUTTER

Filed Jan. 29, 1948        4 Sheets-Sheet 1

INVENTOR.
BY JOHN H. GEULA
ATTORNEY

Sept. 19, 1950   J. H. GEULA   2,522,818
OPTICAL LENS CUTTER

Filed Jan. 29, 1948   4 Sheets-Sheet 2

INVENTOR.
JOHN H. GEULA
BY
ATTORNEY

Sept. 19, 1950 J. H. GEULA 2,522,818
OPTICAL LENS CUTTER
Filed Jan. 29, 1948 4 Sheets-Sheet 3
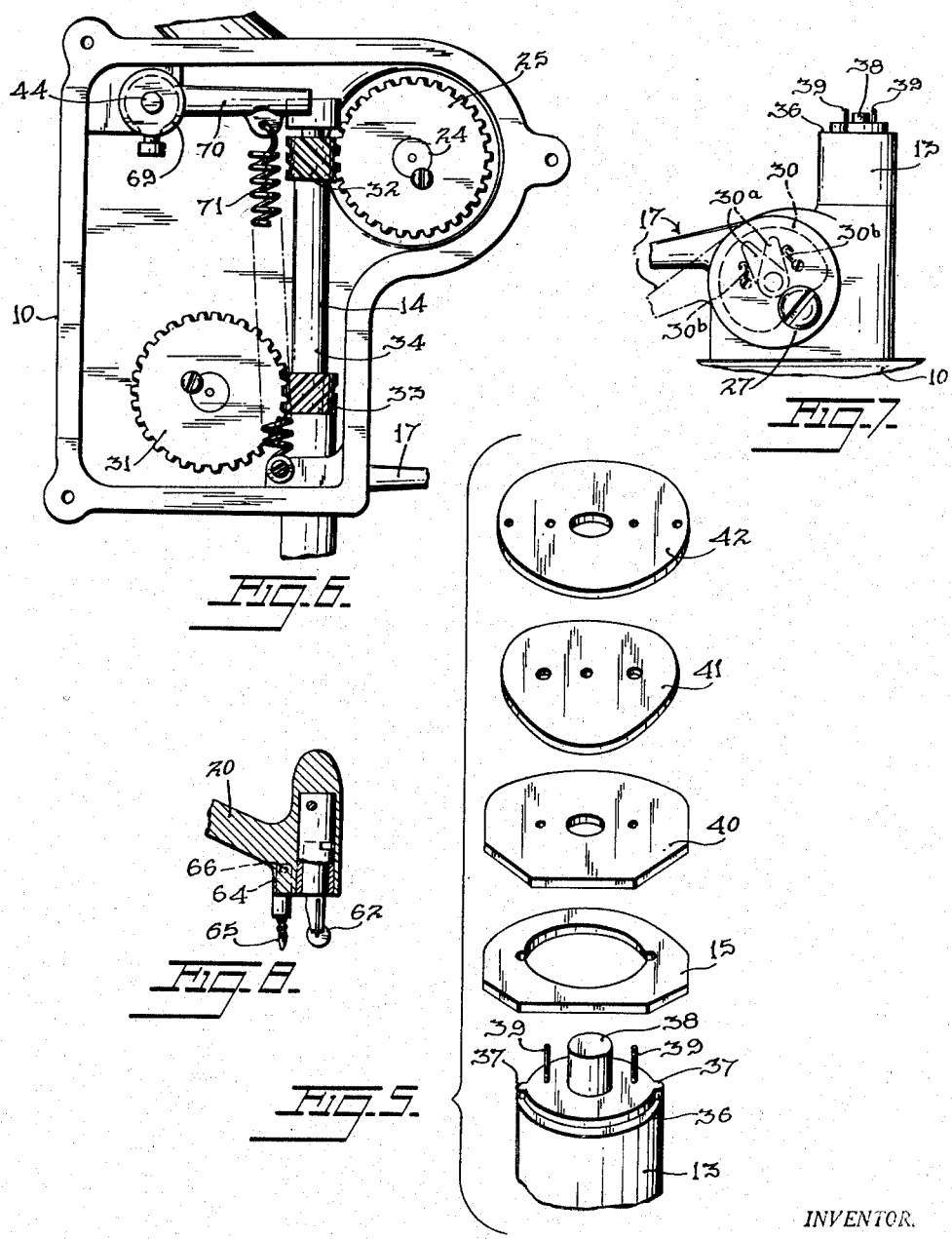
INVENTOR.
JOHN H. GEULA
BY
ATTORNEY

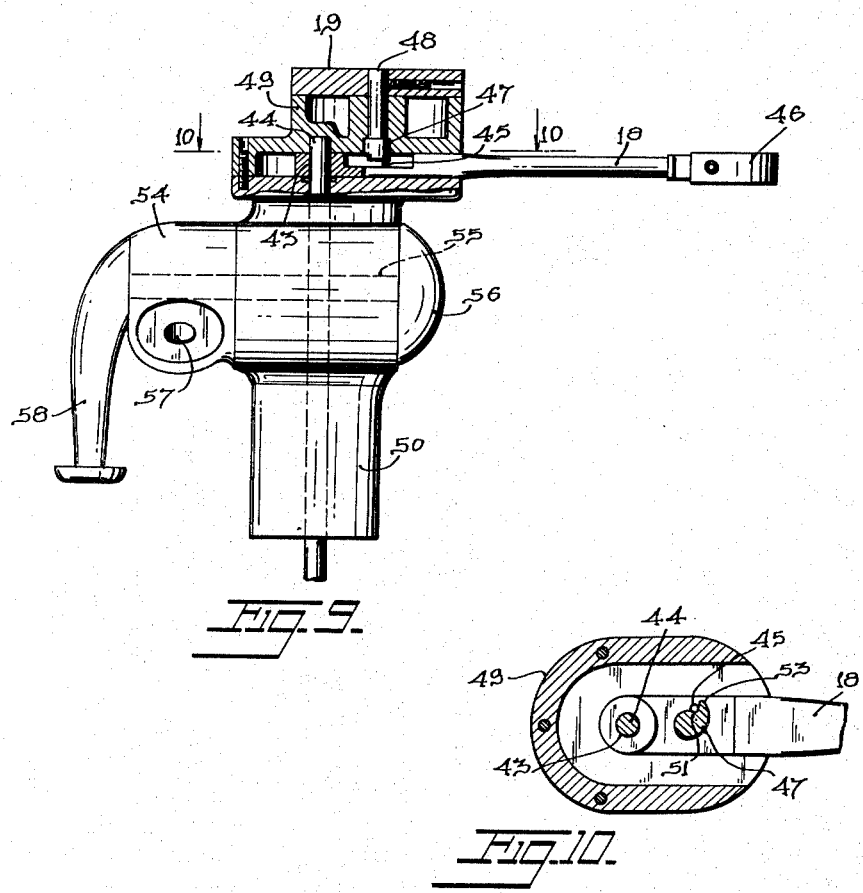

Patented Sept. 19, 1950

2,522,818

UNITED STATES PATENT OFFICE 2,522,818

OPTICAL LENS CUTTER

John H. Geula, New York, N. Y.

Application January 29, 1948, Serial No. 5,069

8 Claims. (Cl. 33—28)

This invention relates to a lens cutting machine.

An object of the present invention is to provide an improved machine for cutting lenses of a certain shape and of different sizes from one and the same former.

A further object is to provide a machine as aforesaid adapted to receive a range of formers, thus providing a large range of different lenses which may be cut.

Another object is to provide a machine as aforesaid in which the adjustment can be readily made to alter the overall size of the lens to be cut.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 5 is a fragmentary view of the former support with various types of formers.

Fig. 6 is a bottom plan view of the machine.

Fig. 7 is a fragmentary view of the mechanism for holding the lens holder in position.

Fig. 8 is an enlarged detail, partly in section, of the wheel and fulcrum of the cutting device.

Fig. 9 is a view, partly broken away, of a portion of the machine containing the follower.

Fig. 10 is a section on the line 10—10 of Fig. 9.

Figure 1:
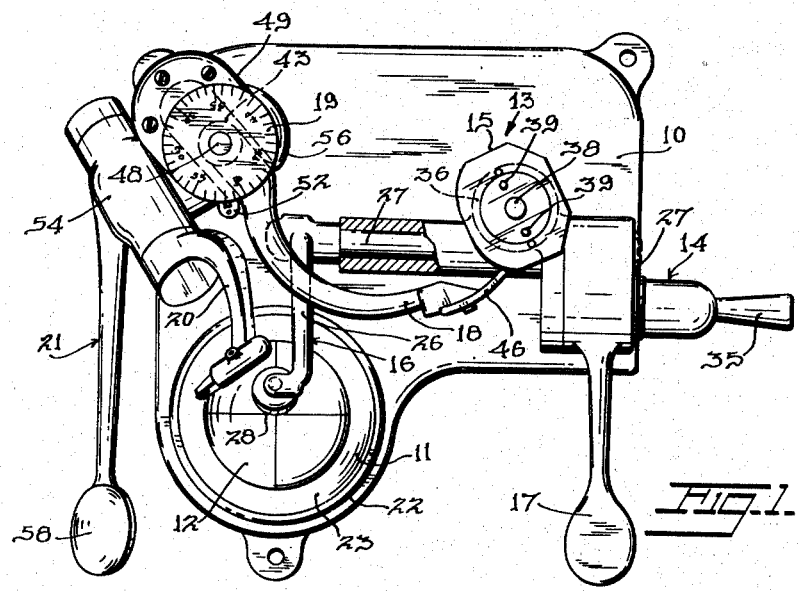
Fig. 1 is a plan view of a lens cutting machine constructed in accordance with this invention, partly broken away to show a rocker shaft.

The lens cutting machine, according to the present invention, includes a housing 10 in which or upon which all of the various parts are contained. The parts consist, generally speaking, of a rotary table 11 for holding a lens 12 to be cut, a die or former support 13, mechanism 14 for turning the table 11 and the support 13 simultaneously so that the lens will be cut in conformity with the former 15 carried by the support, a lens holder 16 and an operating handle 17 therefor, a former follower 18, a dial 19 for adjusting the follower 18, a lens cutter arm 20 and means 21 for operating the lens cutter arm.

The table 11 is best shown in Figs. 1-4. It has a recessed top 22 containing a rubber insert 23 having a slightly concaved top face. The stem 24 which journals the table 11 carries a worm gear 25. The lens to be cut will be centered on the table 11.

The lens holder 16 is best shown in Figs. 1 and 7. It consists of an arm 26 on a rocker shaft 27 and carrying at its end, a universally connected disc 28 adjustably held in place by a set screw 29. The disc 28 has a rubber face and presses the lens 12 into the rubber insert 23. The disc 28 can rock about its universal joint connection so that it seats firmly on the concave face of the lens. Shaft 27 is mounted eccentrically in handle 17, see Fig. 7, the handle having a cavity 30 for receiving any suitable device for limiting rotation of the shaft 27 merely to hold the disc in pressure engagement on the lens so that once the lens is held tightly on the table 11, no further pressure can be applied. The device employed in the present instance consists of a rocking finger 30$^a$ limited in its movement by two pins 30$^b$.

Figure 2:
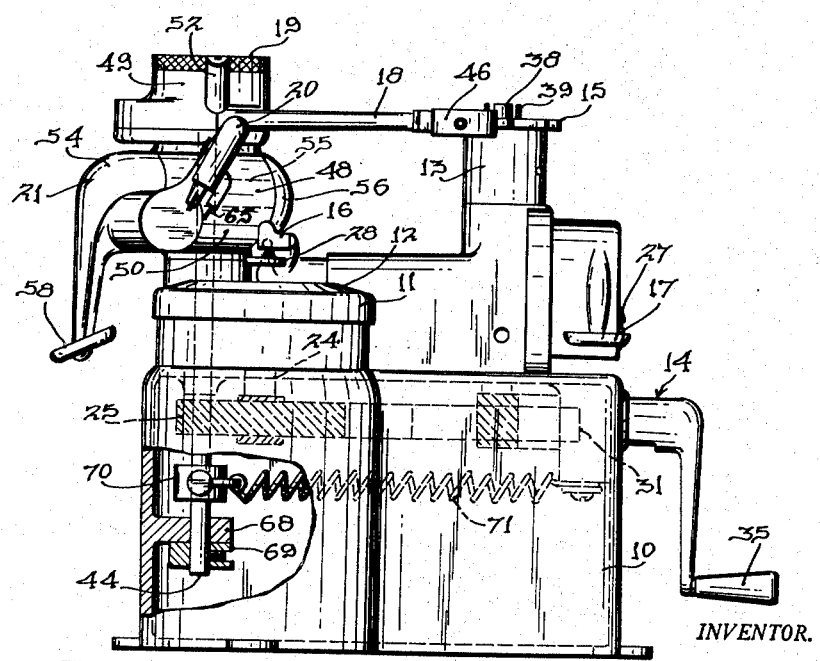
Fig. 2 is a front view of the machine of Fig. 1, partly broken away to show the spring mechanism for holding the follower to the former.

The support 13 carries a worm gear 31. Gears 25 and 31 mesh respectively with worm pinions 32 and 33 on a shaft 34 forming part of the mechanism 14, the handle 35 of which is secured at the outer end of shaft 34. Thus rotation of handle 35 will effect simultaneous rotation of table 11 and support 13. The support 13 is best shown in Figs. 2 and 5. It has a shoulder 36, provided with ears 37, for carrying the former 15. It also has a central post 38 and pins 39 for supporting other formers such as formers 40, 41 and 42 shown in Fig. 5.

The follower 18 is best shown in Figs. 9-10. It has a bearing orifice 43 rotatively engaged on a shaft 44, a recess containing a pin 45, and a finger 46 for running along the edge of the former. The follower pin 45 coacts with a rotary cam 47 on a shaft 48 forming part of the means 21 for operating the lens cutter arm, the shaft 48 being secured to the dial 19. The shaft 44 is connected to the follower through the engagement of the pin 45 with the cam 47 for rotation therewith and its rotation is limited by the follower 18. The follower 18 is partially housed in a small casing 49 secured to the top of a post 50. The follower 18 is fulcrummed at its orifice 43 and is swung by the dial 19, which dial 19 coacts with an arrow 52 on the casing 49 to indicate the adjustment of the follower. Rotation of the dial 19 will rotate cam 47 and thus move pin 45 to change the angularity of the follower 18 relative to the post 50. The importance of this will presently be explained.

The cam 47 begins at a notch 51 determining the smallest cutting radius. To increase this, dial 19 is turned so that the cam face rides along the pin 45, swinging the follower. When the highest point 53 of the cam passes the pin the pin snaps into the notch 51 returning the follower to its starting position.

Figure 3:
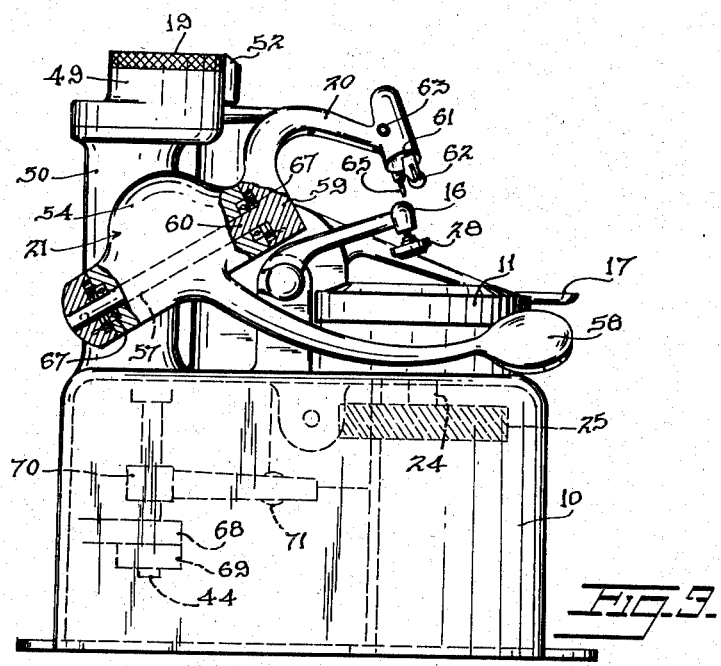
Fig. 3 is a side view of the machine, partly broken away to show the means for permitting the fulcruming of the cutter wheel arm.
Figure 4:
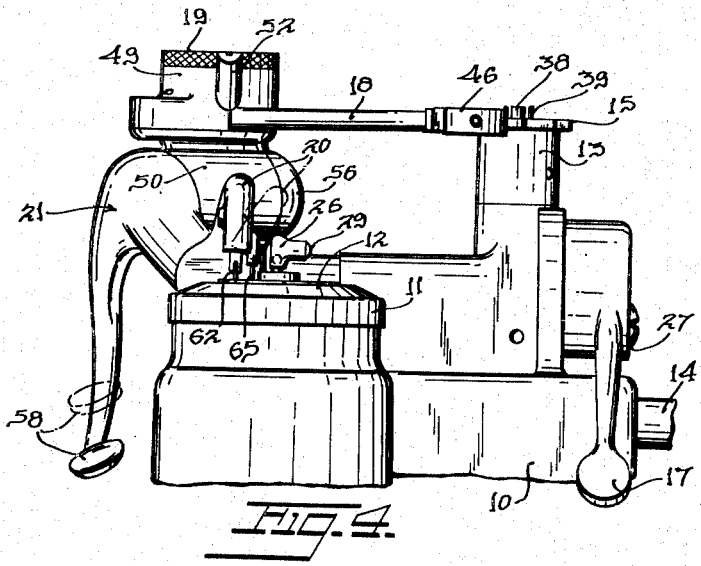
Fig. 4 is a fragmentary front view showing the machine in operative position.

The means 21 for operating the lens cutter arm further includes a device best shown in Figs. 1 to 4. This device consists of a body 54 rotatively supported on the post 50 by a transverse shaft 55 passing through the post 50 and carrying on one end, the body 54, and on the other end a cap 56. The post 50 has a force fit on the shaft 44 to turn therewith. The body 54 also has a bearing or bore 57 at right angles to the shaft 55 and this bore 57 forms a support for a shaft, presently to be described, for the cutter arm 20. A handle 58 is provided. When this handle is pressed down as shown in Fig. 4, it forces the cutter arm 20 down, inclining the axis of the bore 57. When it is released, the cutter arm can be raised as shown in Fig. 3. The cutter arm also is permitted a slight free motion for rocking about the axis of the bore 57. Friction of the shaft 54 in the post 50 retains the cutting arm 20 in the inoperative position shown in Figs. 2 and 3.

The cutter arm 20, see Fig. 3, has a hub 59 integrally formed with a shaft 60 rotatively extended through the bore 57. Shaft 60 can rotate slightly in the bore 57. At the free end of the cutter arm 20 there is a socket 61 for a rotary cutter wheel 62 held therein by a set screw 63 and a socket 64 for a guide pin 65 held therein by a set screw 66. The pin 65 forms a fulcrum for the cutter 62.

The arm 20 can rotate a slight amount about the axis of the shaft 60, to permit the pin 65 to act as a fulcrum, the rotation being stopped when the wheel 62 touches the lens. Rotation is frictionally resisted by the spring devices 67 shown in Fig. 3 so that once the wheel engages the lens it will have a tendency to stay there.

The shaft 44 extends downward below the rest of the mechanism through a lug 68 forming part of the housing 10 and is anchored against upward movement by a collar 69. An arm 70 is mounted on the shaft 44 above the lug 68, and a tension coil spring 71 is connected at one end to the free end of the arm 70 and at its other end to the housing 10 to exert a force forcing the follower 18 against the former 15. When the dial has been rotated sufficiently to bring the cam notch 51 to the pin 45, the follower 18 is released, but since the free end of the follower bears against the former 15, the shaft 44 with the post 50 will rotate and not the follower 18, unsetting the device.

The operation of the machine is as follows:

The machine is in its starting position in Fig. 1 with the lens 12 laying centered on the table 11. The operator first pushes down the handle 17 to hold the lens and then pushes down on handle 58. This rocks the arm 20 about the axis of shaft 55, until the pin 65 touches the lens, forming a fulcrum, see the dot-dash position shown in Fig. 4; the arm thereafter rocking about the axis of the shaft 60 until the cutter wheel 62 touches the lens. The arm 70 is then rotated horizontally by the spring 71 so that the finger 46 touches the chosen former. If at this time the wheel is not resting on the lens at the correct distance from its axis, the dial 19 is rotated to the proper adjustment as indicated by the arrow 52. The finger 46 is kept in contact with the former during this rotation of the shaft 44 and the dial 19 effecting a rotation of the post 50 in one direction or the other, depending upon the rotation of the dial 19. When the right position is found, the operator holds onto the handle 58 and the spring 71 applies light pressure to hold the follower 18 against the former. The operator then rotates the handle 35, rotating the table and the former, thereby effecting cutting of the lens according to the correct shape (shape of former) and correct size as determined by the dial 19. To change the shape, other formers are used. To change the size, the dial 19 is rotated to other positions.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A lens cutting machine comprising a rotary table for supporting the lens to be cut, a device for holding the lens to said table consisting of a rocker shaft, an arm thereon for pressing against said lens and an operating lever thereon, a former support, a former thereon, mechanism for rotating said former support and table simultaneously including a gear on said table, a gear on said support, a rotary shaft, gears on said rotary shaft meshing with said table and support gears and a handle for rotating said rotary shaft, a body rotatable freely about an axis parallel to said table axis, a dial rotatable about an axis parallel to but offset from said body axis, a follower rotative on a shaft passing fixedly through said body concentric with its rotative axis and having a pin offset from said body axis, a cam coacting with said pin for changing the angularity between said follower and said body, said cam being secured to said dial for rotation therewith, said follower being adapted to rub against said former for turning said body in response to changes in the contour of said former, the angle of said follower relative to said body being adjustable by rotation of said dial, said body carrying a shaft at right angles to said body axis, a device mounted on said body shaft for rocking thereabout, a handle on said device for effecting its said rocking, said device having a second shaft at right angles to its first shaft and to said body axis, a lens cutter mounted on said second shaft for rotation therewith about said first shaft and for limited rotation about said second shaft relative to said first shaft, a lens cutting wheel carried by said cutter, and a fulcrum pin carried by said cutter.

2. A lens cutting machine comprising a rotary table for supporting the lens to be cut, a device for holding the lens to said table consisting of a rocker shaft, an arm thereon for pressing against said lens and an operating lever thereon, a former support, a former thereon, mechanism for rotating said former support and table simultaneously including a gear on said table, a gear on said support, a rotary shaft, gears on said rotary shaft meshing with said table and support gears and a handle for rotating said rotary shaft, a body rotatable freely about an axis parallel to said table axis, a casing on top of said body for rotation therewith, a dial on said casing rotatable about an axis parallel to but offset from said body axis, a follower rotative on a shaft passing fixedly through said body concentric with its rotative axis and having a pin offset from said body axis, the follower being partially housed within said casing, a cam coacting with said pin for changing the angularity between said follower and said body, said cam being secured to said dial for rotation therewith, said follower being adapted to rub against said former for turning said body in response to changes in the contour of said former, the angle of said follower relative to said body being adjustable by rotation of said dial, said body carrying a shaft at right angles to said body axis, a device mounted on said body shaft for rocking thereabout, a handle on said device for effecting its said rocking, said device having a second shaft at right angles to its first shaft and to said body axis, a lens cutter mounted on said second shaft for rotation therewith about said first shaft and for limited rotation about said second shaft relative to said first shaft, a lens cutting wheel carried by said cutter, and a fulcrum pin carried by said cutter.

3. A lens cutting machine comprising a rotary table having a concave rubber top for supporting the lens to be cut, a device for holding the lens to said table consisting of a rocker shaft, an arm thereon for pressing against said lens and an operating lever thereon, a former support, a former thereon, mechanism for rotating said former support and table simultaneously including a gear on said table, a gear on said support, a rotary shaft, gears on said rotary shaft meshing with said table and support gears and a handle for rotating said rotary shaft, a body rotatable freely about an axis parallel to said table axis, a dial rotatable about an axis parallel to but offset from said body axis, a follower rotative on a shaft passing fixedly through said body concentric with its rotative axis and having a pin offset from said body axis, a cam coacting with said pin for changing the angularity between said follower and said body, said cam being secured to said dial for rotation therewith, said follower being adapted to rub against said former for turning said body in response to changes in the contour of said former, the angle of said follower relative to said body being adjustable by rotation of said dial, said body carrying a shaft at right angles to said body axis, a device mounted on said body shaft for rocking thereabout, a handle on said device for effecting its said rocking, said device having a second shaft at right angles to its first shaft and to said body axis, a lens cutter mounted on said second shaft for rotation therewith about said first shaft and for limited rotation about said second shaft relative to said first shaft, a lens cutting wheel carried by said cutter, and a fulcrum pin carried by said cutter.

4. A lens cutting machine comprising a rotary table for supporting the lens to be cut, a device for holding the lens to said table consisting of a rocker shaft, an arm thereon having a disc for pressing against the center of said lens and an operating lever thereon, a former support, a former thereon, mechanism for rotating said former support and table simultaneously including a gear on said table, a gear on said support, a rotary shaft, gears on said rotary shaft meshing with said tables and support gears and a handle for rotating said rotary shaft, a body rotatable freely about an axis parallel to said table axis, a dial rotatable about an axis parallel to but offset from said body axis, a follower rotative on a shaft passing fixedly through said body concentric with its rotative axis and having a pin offset from said body axis, a cam coacting with said pin for changing the angularity between said follower and said body, said cam being secured to said dial for rotation therewith, said follower being adapted to rub against said former for turning said body in response to changes in the contour of said former, the angle of said follower relative to said body being adjustable by rotation of said dial, said body carrying a shaft at right angles to said body axis, a device mounted on said body shaft for rocking thereabout, a handle on said device for effecting its said rocking, said device having a second shaft at right angles to its first shaft and to said body axis, a lens cutter mounted on said second shaft for rotation therewith about said first shaft and for limited rotation about said second shaft relative to said first shaft, a lens cutting wheel carried by said cutter, and a fulcrum pin carried by said cutter.

5. A lens cutting machine comprising a rotary table for supporting the lens to be cut, a device for holding the lens to said table consisting of a rocker shaft, an arm thereon for pressing against said lens and an operating lever thereon, a former support, a former thereon, mechanism for rotating said former support and table simultaneously including a gear on said table, a gear on said support, a rotary shaft, gears on said rotary shaft meshing with said table and support gears and a handle for rotating said rotary shaft, a body rotatable freely about an axis parallel to said table axis, a dial rotatable about an axis parallel to but offset from said body axis, a follower rotative on a shaft passing fixedly through said body concentric with its rotative axis and having a pin offset from said body axis, a cam coacting with said pin for changing the angularity between said follower and said body, said cam being secured to said dial for rotation therewith, said follower being adapted to rub against said former for turning said body in response to changes in the contour of said former, the angle of said follower relative to said body being adjustable by rotation of said dial, said body carrying a shaft at right angles to said body axis, a device mounted on said body shaft for rocking thereabout, a handle on said device for effecting its said rocking, said device having a second shaft at right angles to its first shaft and to said body axis, a lens cutter mounted on said second shaft for rotation therewith about said first shaft and a lens cutting wheel carried by said cutter.

6. A lens cutting machine comprising a rotary table for supporting the lens to be cut, a device for holding the lens to said table consisting of a rocker shaft, an arm thereon for pressing against said lens and an operating lever thereon, a former support, a former thereon, mechanism for rotating said former support and table simultaneously including a gear on said table, a gear on said support, a rotary shaft, gears on said rotary shaft meshing with said table and support gears and a handle for rotating said rotary shaft, a body rotatable freely about an axis parallel to said table axis, a dial rotatable about an axis parallel to but offset from said body axis, a follower rotative on a shaft passing fixedly through said body concentric with its rotative axis and having a pin offset from said body axis, a cam coacting with said pin for changing the angularity between said follower and said body, said cam being secured to said dial for rotation therewith, said follower being adapted to rub against said former for turning said body in response to changes in the contour of said former, the angle of said follower relative to said body being adjustable by rotation of said dial, said body carrying a shaft at right angles to said body axis, a device mounted on said body shaft for rocking thereabout, a handle on said device for effecting its said rocking, said device having a second shaft at right angles to its first shaft and to said body axis, a lens cutter mounted on said second shaft for rotation therewith about said first shaft and for limited rotation about said second shaft relative to said first shaft, a lens cutting wheel carried by said cutter, a fulcrum pin carried by said cutter, and means urging said follower against said former.

7. A lens cutting machine comprising a rotary table for supporting the lens to be cut, a device for holding the lens to said table consisting of a rocker shaft, an arm thereon for pressing against said lens and an operating lever thereon, a former support, a former thereon, mechanism for rotating said former support and table simultaneously including a gear on said table, a gear on said support, a rotary shaft, gears on said rotary shaft meshing with said table and support gears and a handle for rotating said rotary shaft, a body rotatable freely about an axis parallel to said table axis, a dial rotatable about an axis parallel to but offset from said body axis, a follower rotative on a shaft passing fixedly through said body concentric with its rotative axis and having a pin offset from said body axis, a cam coacting with said pin for changing the angularity between said follower and said body, said cam being secured to said dial for rotation therewith, said follower being adapted to rub against said former for turning said body in response to changes in the contour of said former, the angle of said follower relative to said body being adjustable by rotation of said dial, said body carrying a shaft at right angles to said body axis, a device mounted on said body shaft for rocking thereabout, a handle on said device for effecting its said rocking, said device having a second shaft at right angles to its first shaft and to said body axis, a lens cutter mounted on said second shaft for rotation therewith about said first shaft and for limited rotation about said second shaft relative to said first shaft, a lens cutting wheel carried by said cutter, and a fulcrum pin carried by said cutter, said cam being of 360 degrees and dropping sharply from its highest to its lowest point.

8. A lens cutting machine comprising a rotary table for supporting the lens to be cut, a device for holding the lens to said table consisting of a rocker shaft, an arm thereon for pressing against said lens and an operating lever thereon, a former support, a former thereon, mechanism for rotating said former support and table simultaneously including a gear on said table, a gear on said support, a rotary shaft, gears on said rotary shaft meshing with said table and support gears and a handle for rotating said rotary shaft, a body rotatable freely about an axis parallel to said table axis, a casing secured to said body, a dial rotatable in said casing about an axis parallel to but offset from said body axis, a follower rotative on a shaft passing fixedly through said body concentric with its rotative axis and having a pin offset from said body axis, a cam coacting with said pin for changing the angularity between said follower and said casing, said cam being secured to said dial for swinging said casing and body, said follower being adapted to rub against asid former for turning said body in response to changes in the contour of said former, the angle of said follower relative to said body being adjustable by rotation of said dial, said body carrying a shaft at right angles to said body axis, a device mounted on said body shaft for rocking thereabout, a handle on said device for effecting its said rocking, said device having a second shaft at right angles to its first shaft and to said body axis, a lens cutter mounted on said second shaft for rotation therewith about said first shaft and for limited rotation about said second shaft relative to said first shaft, a lens cutting wheel carried by said cutter, and a fulcrum pin carried by said cutter.

JOHN H. GEULA.

REFERENCES CITED

The following references are of record in the file of this patent:

UNITED STATES PATENTS

| Number | Name | Date |
|---|---|---|
| 1,997,561 | Lockhart | Apr. 9, 1935 |
| 2,341,201 | Ballard | Feb. 8, 1944 |